US012576432B2

(12) United States Patent
Fukumoto et al.

(10) Patent No.: US 12,576,432 B2
(45) Date of Patent: Mar. 17, 2026

(54) VIBRATION DEVICE

(71) Applicant: FOSTER ELECTRIC COMPANY, LIMITED, Tokyo (JP)

(72) Inventors: Yoji Fukumoto, Akishima (JP); Shinya Suzuki, Akishima (JP); Karen Kobayashi, Akishima (JP); Yosuke Haba, Akishima (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 44 days.

(21) Appl. No.: 18/837,655

(22) PCT Filed: Feb. 17, 2023

(86) PCT No.: PCT/JP2023/005829
§ 371 (c)(1),
(2) Date: Aug. 12, 2024

(87) PCT Pub. No.: WO2023/162894
PCT Pub. Date: Aug. 31, 2023

(65) Prior Publication Data
US 2025/0161984 A1 May 22, 2025

(30) Foreign Application Priority Data
Feb. 22, 2022 (JP) ................................. 2022-025685

(51) Int. Cl.
*B06B 1/02* (2006.01)
*B60N 2/90* (2018.01)
(52) U.S. Cl.
CPC .............. *B06B 1/0207* (2013.01); *B60N 2/90* (2018.02)

(58) Field of Classification Search
None
See application file for complete search history.

(56) References Cited

U.S. PATENT DOCUMENTS

| | | | |
|---|---|---|---|
| 11,927,236 B2 * | 3/2024 | Gandhi ................ | F16F 15/1215 |
| 2014/0341395 A1 | 11/2014 | Matsumoto et al. | |
| 2023/0191954 A1 * | 6/2023 | Kim ......................... | B60N 2/20 |
| | | | 701/49 |
| 2025/0013305 A1 * | 1/2025 | Konyo .................... | G06F 3/016 |

FOREIGN PATENT DOCUMENTS

| | | |
|---|---|---|
| JP | S53-086118 U | 7/1978 |
| JP | H08228391 A | 9/1996 |
| JP | 2002-354567 A | 12/2002 |
| WO | WO-2013/038459 A1 | 3/2013 |

OTHER PUBLICATIONS

Search Report and Written Opinion in International Application No. PCT/JP2023/005829 dated Apr. 25, 2023, 9 pages.

* cited by examiner

*Primary Examiner* — Fekadeselassie Girma
(74) *Attorney, Agent, or Firm* — Marshall, Gerstein & Borun LLP

(57) ABSTRACT

A vibration device causes a vehicle seat, including a seat frame that supports the seat relative to a vehicle body and a seat cushion that supports a seated occupant, to vibrate. The vibration device includes a vibrator having a vibration face attached to a seat frame, and a vibration control device that causes the vibrator to vibrate based on an input sound source signal.

10 Claims, 7 Drawing Sheets

THRESHOLD
VALUE LEVEL

VIBRATION DEVICE

TECHNICAL FIELD

The technique of the present disclosure relates to a vibration device.

BACKGROUND ART

In about the 1980s, body-sonic audio became popular in the fields of car audio and home audio. In body-sonic audio, primarily, a vibrator is attached to at least one of a seat sitting surface or the seat rear surface, and the vibrator generates vibrations primarily in accordance with low-frequency signals. Further, the vibrations are reproduced in conjunction with music from a speaker provided separately, providing the listener with an enhanced listening experience.

For example, a technique for attaching body-sonic to a vehicle seat is known (Japanese Utility Model Application Laid-Open No. S53-86118).

SUMMARY OF THE INVENTION

Problem to be Solved by the Invention

In the above-mentioned Japanese Utility Model Application Laid-open No. S53-86118, while a vibration unit is attached to a sub-frame which is attached to the seat frame, since the configuration is such that vibration is transmitted from the sub-frame through a fabric to a urethane material, sufficient vibration is not obtained and there is room for improvement.

In consideration of the above-described circumstances, the technique of the present disclosure aims to provide a vibration device that can provide a seated occupant with sufficient vibration based on a sound source signal.

Means for Solving the Problem

A first aspect of the present disclosure is vibration device that vibrates a vehicle seat, the vibration device including: a vibrator that has a vibration face that is attached to a seat frame forming a framework of the vehicle seat, the vibrator imparting vibration to the seat frame; and a control unit that causes the vibrator to vibrate based on an input sound source signal.

Effects of the Invention

As explained above, according to the technique of the present disclosure, it is possible to provide a seated occupant with sufficient vibration based on a sound source signal.

BEST MODE FOR CARRYING OUT THE INVENTION

Hereinafter, embodiments of the technique of the present disclosure will be described in detail with reference to the drawings.

<Configuration of Seat Vibration System According to Embodiment of Technique of Present Disclosure>

Figure 1:
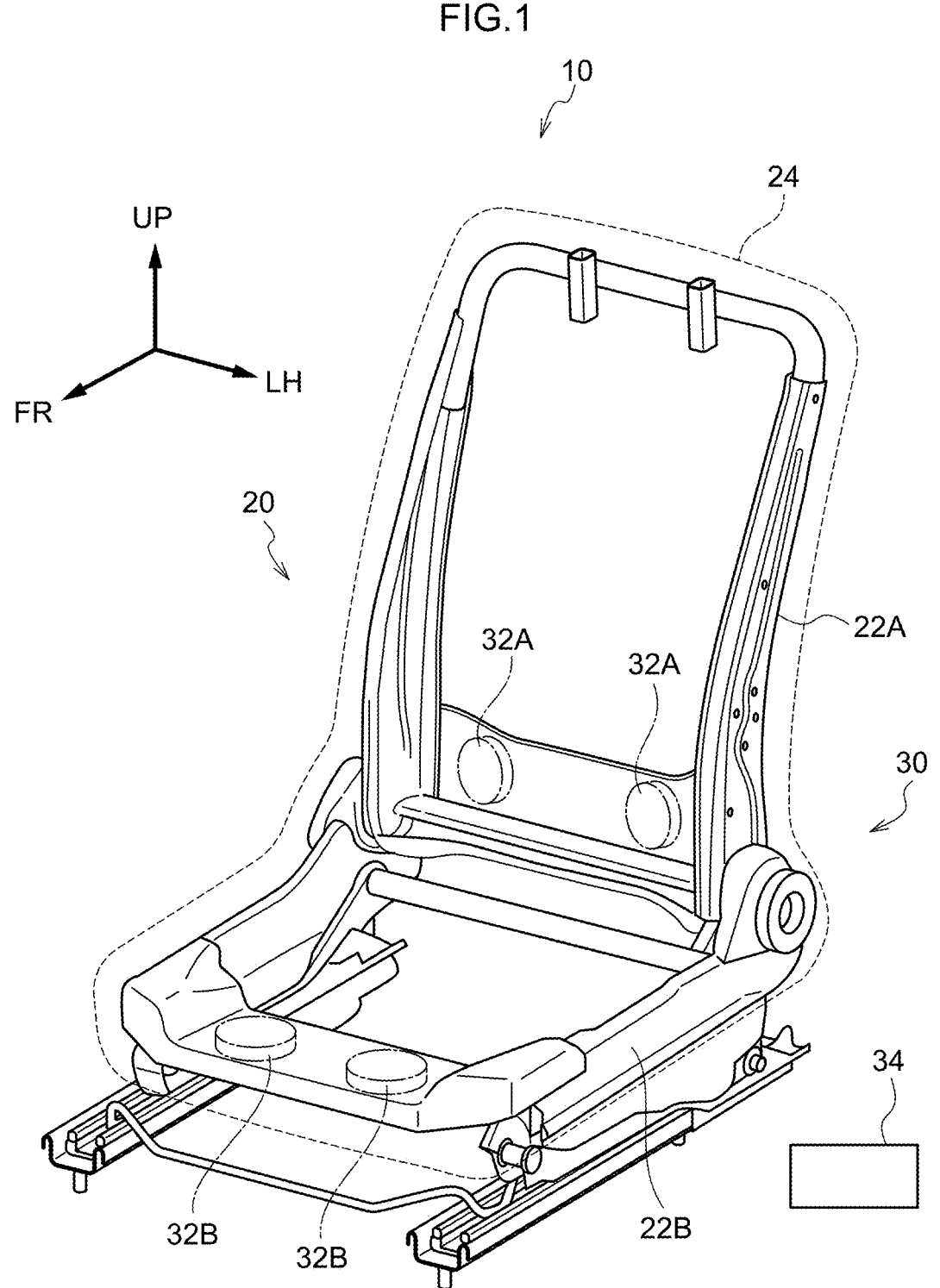
FIG. 1 is a schematic diagram of a seat vibration system according to an embodiment of the technique of the present disclosure.

FIG. 1 shows a schematic diagram of a seat vibration system 10 according to an embodiment of the technique of the present disclosure. The arrow FR shown in FIG. 1 indicates the front side of the seat, the arrow UP indicates the upper side of the seat, and the arrow LH indicates the left side of the seat.

As shown in FIG. 1, the seat vibration system 10 includes a vehicle seat 20 and a vibration device 30.

The vehicle seat 20 includes a seat frame 22A on a rear face side that configures a framework that supports the seat relative to the vehicle body, a seat frame 22B on a seat surface side that configures a framework, and a seat cushion 24 that supports a seated occupant. In FIG. 1, the seat cushion 24 is shown in a see-through manner, and seat springs are not shown.

In a case in which there is no need to distinguish between the rear face-side seat frame 22A and the seat surface-side seat frame 22B, these are referred to as the seat frame 22.

The vibration device 30 includes a rear face-side vibrator 32A attached to the rear face-side seat frame 22A, a seat surface-side vibrator 32B attached to the seat surface-side seat frame 22B, and a vibration control device 34. The rear face-side vibrator 32A and the seat surface-side vibrator 32B have the same configuration, and are referred to as vibrator 32 when there is no need to distinguish between them. The vibration control device 34 is attached to the vehicle seat 20 or installed within the vehicle.

Figure 2A:
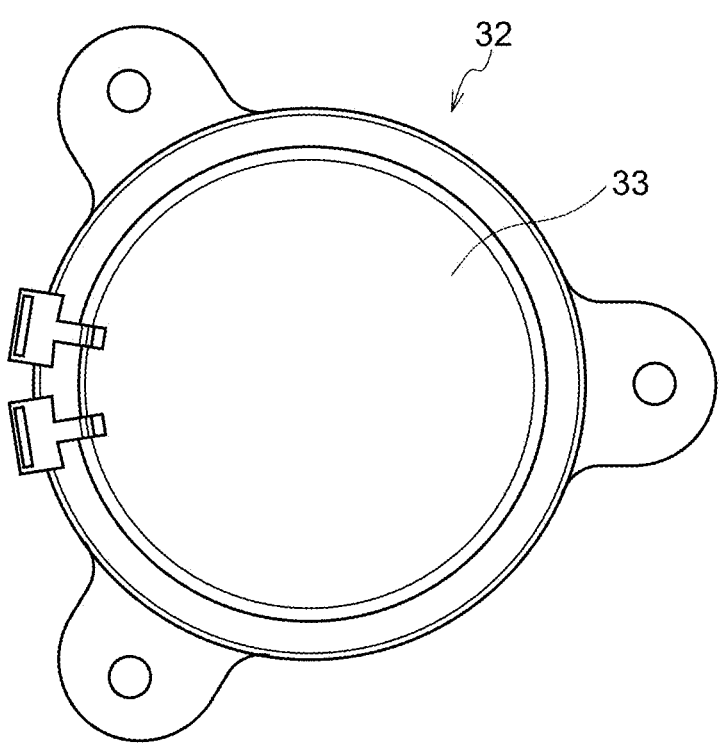
FIG. 2A is a top view showing a configuration of a vibration device according to an embodiment of the technique of the present disclosure.
Figure 2B:
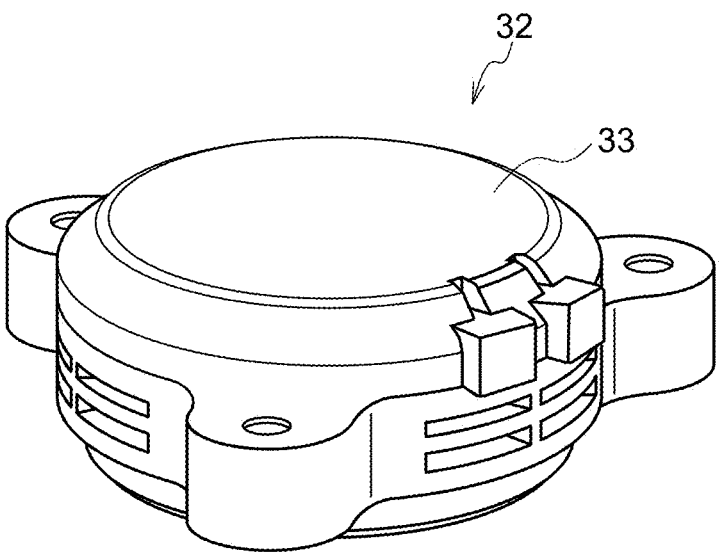
FIG. 2B is a perspective view showing a configuration of a vibration device according to an embodiment of the technique of the present disclosure.

FIG. 2A is a top view of the vibrator 32, and FIG. 2B is a perspective view of the vibrator 32. The vibrator 32 is an actuator, and is configured by, for example, a voice coil-type actuator.

Figure 3:
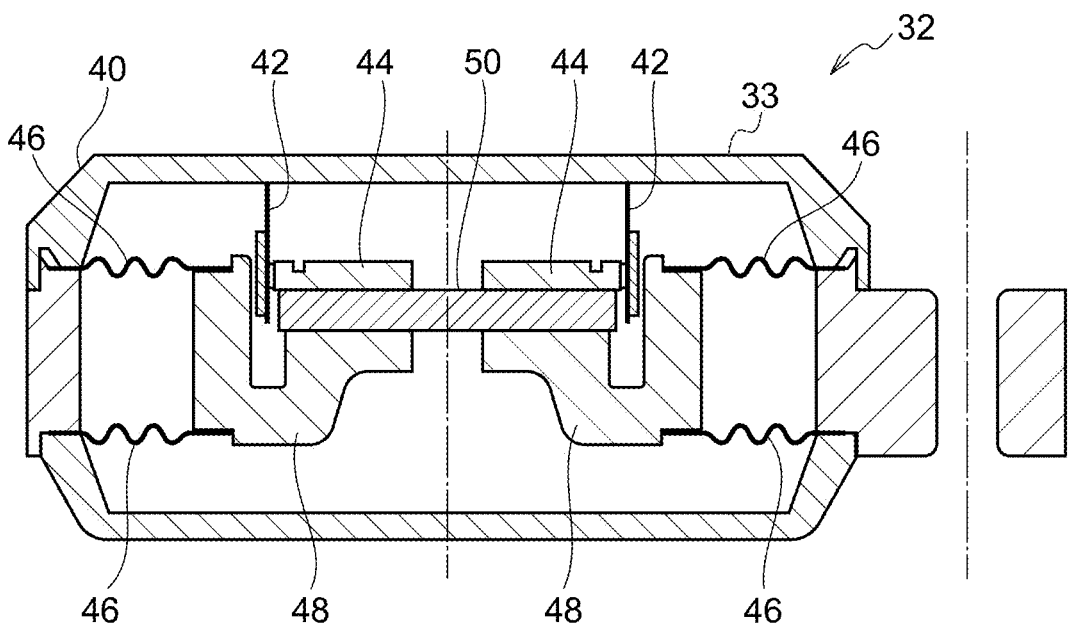
FIG. 3 is a cross-sectional view showing a configuration of a vibration device according to an embodiment of the technique of the present disclosure.

FIG. 3 is a cross-sectional view of the vibrator 32. As shown in FIG. 3, a voice coil 42, a pole piece 44, a damper 46, a yoke 48, and a magnet 50 are provided inside a housing 40 of the vibrator 32.

Figure 4:
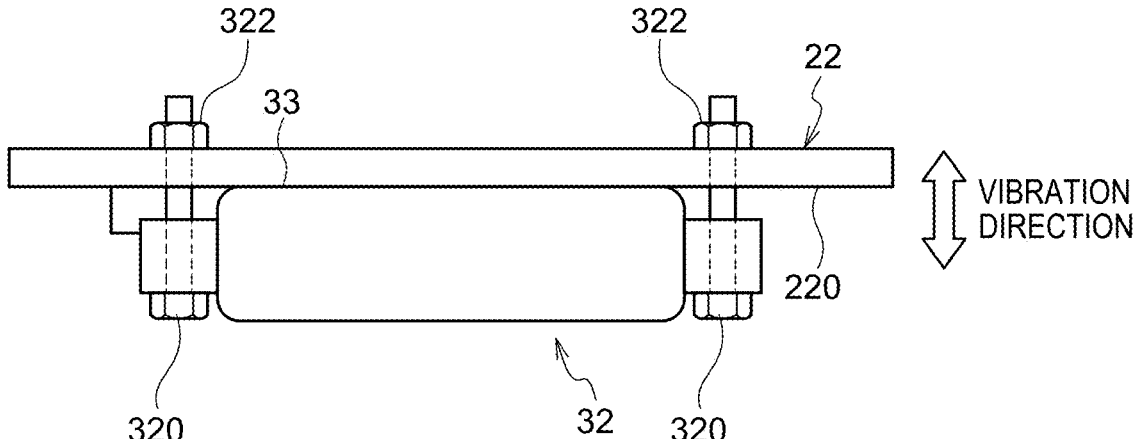
FIG. 4 is a side view for explaining a method of attaching the vibration device according to an embodiment of the technique of the present disclosure.

As shown in FIG. 4, the vibrator 32 is attached to the seat frame 22 such that the normal direction of an attachment surface 220 of the seat frame 22 to which the vibrator 32 is attached corresponds to the vibration direction of the vibrator 32. That is, the vibrator 32 is attached so that the attachment surface 220 of the seat frame 22 and a vibration face 33 of the vibrator 32 contact each other. The vibration face 33 is a face at which the vibration direction of the vibrator 32 corresponds to the normal direction of the face. The vibrator 32 is attached to the seat frame 22 that forms the framework of the vehicle seat 20 with the vibration face 33 in contact therewith, and imparts vibration toward the seat frame 22. Further, the vibrator 32 and the seat frame 22 are attached by a bolt 320 and a nut 322.

Specifically, the rear face-side vibrator 32A is attached to a surface at a lower part of the rear face-side seat frame 22A. Further, a seat surface-side vibrator 32B is attached to a surface at the back side of the seat surface-side seat frame 22B. The rear face-side vibrator 32A may be provided at a seat front-side face at a lower part of the seat frame 22A, or at a seat rear-side face. Further, the seat surface-side vibrator 32B may be provided at the back face (the seat lower side face) of the seat surface-side seat frame 22B, or at the seat front-side face.

By attaching the vibrator 32 to the metal seat frame 22, which has a small amount of vibration attenuation, vibration from the vibrator 32 is efficiently transmitted to the seat frame 22. Vibration is transmitted to a seat occupant through a seat cushion 24 attached to the seat frame 22.

Figure 5:
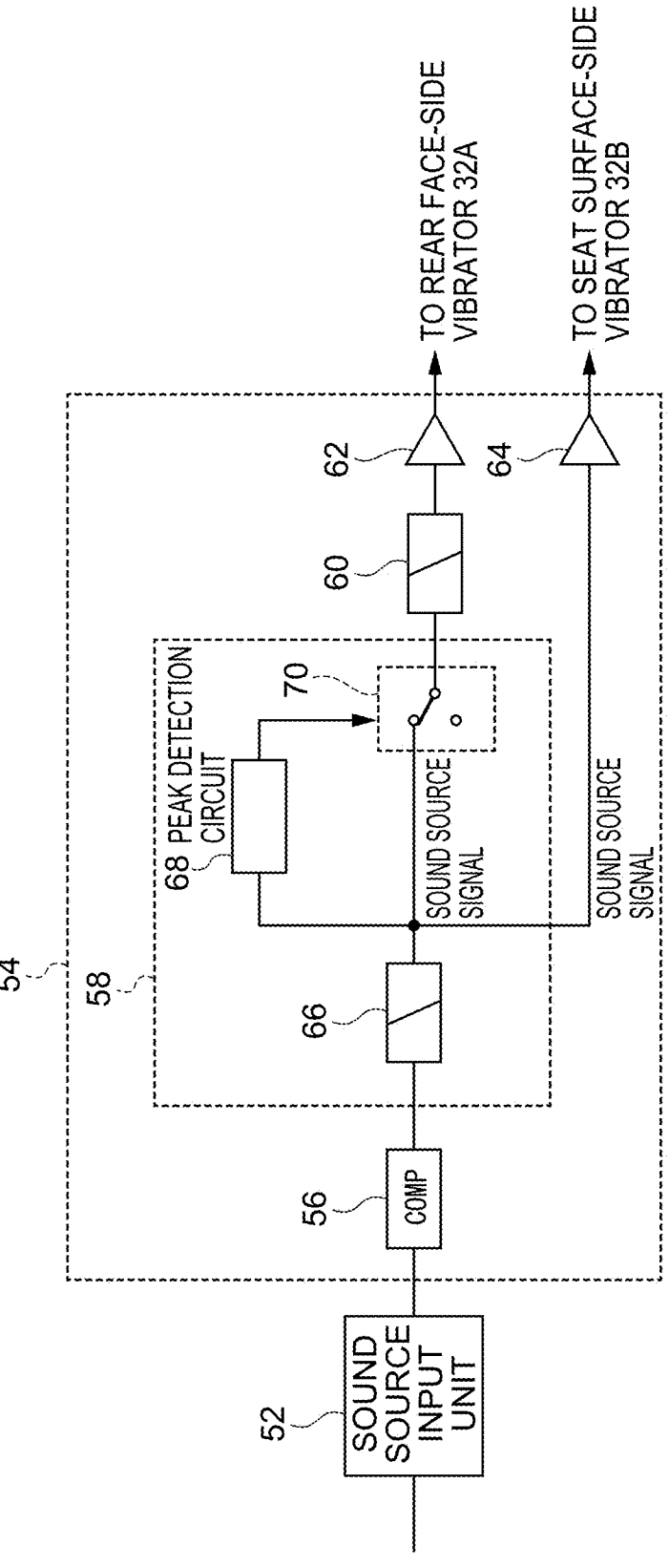
FIG. 5 is a block diagram showing a configuration of a vibration control device according to an embodiment of the technique of the present disclosure.

As shown in FIG. 5, the vibration control device 34 includes a sound source input unit 52 and a control unit 54.

The sound source input unit 52 receives an input of a sound source signal from a car audio device, an audio player or the like. For example, the sound source signal is a sound source signal for playing music. Further, sound is output from a speaker (not shown) inside the vehicle in response to a sound source signal from a car audio device, an audio player, or the like.

The control unit 54 causes the vibrator 32 to vibrate based on the sound source signal. Specifically, the control unit 54 extracts a low frequency range component from the sound source signal using a low-pass filter, and causes the seat surface-side vibrator 32B to vibrate with the low frequency range component.

Further, the control unit 54 detects a signal having a specific frequency range component equal to or greater than a threshold value as a specific signal from the low frequency range component of the sound source signal, and the rear face-side vibrator 32A is vibrated with the low frequency range component for a predetermined period including the timing of detection of the specific signal.

More specifically, the control unit 54 is provided with a COMP 56, a sound source separation circuit 58, a POP noise suppression low pass filter 60, a driving amplifier 62 for a rear face actuator, and a driving amplifier 64 for a seat surface actuator.

The sound source separation circuit 58 includes a low pass filter 66, a peak detection circuit 68, and a switch circuit 70.

The COMP 56 receives a sound source signal as input and equalizes the signal level. This allows level differences between songs to be absorbed and operation to be stabilized.

The low pass filter 66 extracts low frequency range components (for example, low frequency range components of 150 Hz or lower) from the output signal of the COMP 56. This allows, for example, a sound corresponding to a bass drum to be obtained.

The peak detection circuit 68 detects peaks having a signal level that is equal to or greater than a threshold value from the output signal of the low pass filter 66, and outputs a signal that is on during a predetermined period including the peak detection timing. For example, a signal that is on for only a predetermined duration from the peak detection timing is output.

Figure 6:
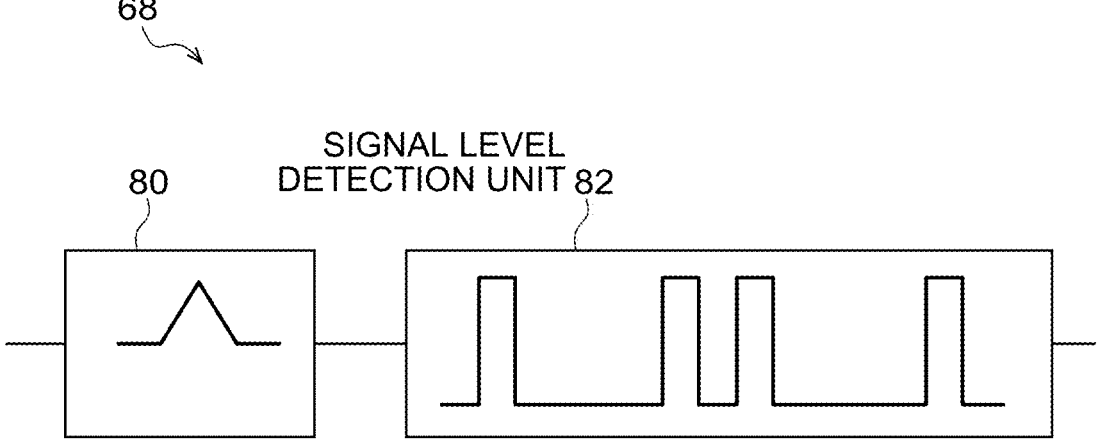
FIG. 6 is a block diagram showing a configuration of a peak detection circuit according to an embodiment of the technique of the present disclosure.

As shown in FIG. 6, the peak detection circuit 68 includes an equalizer 80 and a signal level detection unit 82.

The equalizer 80 increases the signal level of the 50 to 80 Hz component, which is the main component of a bass drum, with respect to the output signal of the low-pass filter 66.

The signal level detection unit 82 detects a signal that exceeds a threshold level from the output signal of the equalizer 80, and sends this to the switch circuit 70 in the subsequent stage. Here, the detected signal is mainly the bass drum component. This processing makes it possible to output an on signal that is synchronized with the timing of the bass drum.

While there are various methods for detecting the signal level, in the present embodiment, an integrated circuit (IC) that detects the signal level is used.

In a case in which the peak detection circuit 68 has output an on signal, the switch circuit 70 outputs the output signal of the low pass filter 66, and in a case in which the peak detection circuit 68 has output an off signal, the switch circuit 70 is switched to no output.

The output signal of the switch circuit 70 is input to the driving amplifier 62 for the rear face actuator via the POP noise suppression low pass filter 60.

During the period in which the peak detection circuit 68 outputs an on signal, the switch circuit 70 causes the output signal of the low pass filter 66 to be supplied to the rear face-side vibrator 32A by the driving amplifier 62 for the rear face actuator. As a result, the rear face-side vibrator 32A is driven at the timing at which the bass drum sounds. During the period in which the peak detection circuit 68 outputs an off signal, the switch circuit 70 prevents the rear face-side vibrator 32A from being driven.

Here, if the signal from the switch circuit 70 is directly supplied to the rear face-side vibrator 32A, the amplitude value may change significantly depending on the timing of switching by the switch circuit 70, and at such time, POP noise is generated. In the present embodiment, the POP noise suppression low pass filter 60 is used to suppress POP noise.

In addition, the output signal of the low pass filter 66 is input to the driving amplifier 64 for the seat surface actuator. As a result, the output signal of the low pass filter 66 is supplied to the seat surface-side vibrator 32B via the driving amplifier 64 for a seat surface actuator.

<Operation of the Vibration Device of the Embodiment of the Technique of the Present Disclosure>

An occupant sits in the vehicle seat 20, and the vibration control device 34 receives an input of a sound source signal from a car audio device, an audio player, or the like.

The COMP 56 of the vibration control device 34 receives the input of the sound source signal, equalizes the signal level, and outputs the signal to the low pass filter 66.

The low pass filter 66 extracts low frequency range components from the output signal of the COMP 56, and outputs these to the peak detection circuit 68, the switch circuit 70, and the driving amplifier 64 for the seat surface actuator.

The peak detection circuit 68 detects peaks having a signal level that is equal to or greater than a threshold value from the output signal of the low pass filter 66, and outputs a signal that is on during a predetermined period including the peak detection timing, to the switch circuit 70.

In a case in which the peak detection circuit 68 has output an on signal, the switch circuit 70 outputs the output signal of the low pass filter 66, and in a case in which the peak detection circuit 68 has output an off signal, the switch circuit 70 is switched to no output.

Further, the output signal of the switch circuit 70 is input to the driving amplifier 62 for the rear face actuator via the POP noise suppression low pass filter 60.

During the period in which the peak detection circuit 68 outputs an on signal, the switch circuit 70 causes the output signal of the low pass filter 66 to be supplied to the rear face-side vibrator 32A by the driving amplifier 62 for the rear face actuator. As a result, the rear face-side vibrator 32A is driven at the timing at which the bass drum sounds. During the period in which the peak detection circuit 68 outputs an off signal, the switch circuit 70 prevents the rear face-side vibrator 32A from being driven.

In addition, the output signal of the low pass filter 66 is input to the driving amplifier 64 for the seat surface actuator. As a result, the output signal of the low pass filter 66 is supplied to the seat surface-side vibrator 32B via the driving amplifier 64 for a seat surface actuator.

Figure 7:
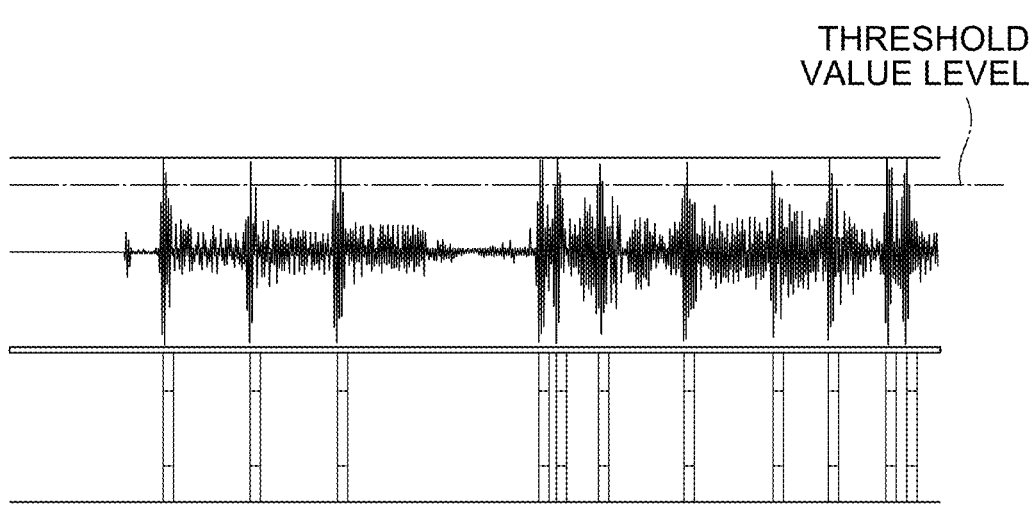
FIG. 7 is a diagram illustrating an example of input and output of a peak detection circuit.

An example of actual operation is shown in FIG. 7. The upper part of FIG. 7 shows a signal input to the signal level detection unit 82, and the lower part shows a signal output from the signal level detection unit 82. In FIG. 7, an example is shown in which each time the input signal exceeds the threshold level (see the dashed line in the upper part), an AC signal is output for a predetermined duration.

As shown in FIG. 7 described above, it can be seen that the low frequency range signal is output at the timing when the level of the low frequency range is high; that is, in time with the bass drum.

As explained above, according to the vibration device according to the embodiment of the technique of the present disclosure, the vibrator is attached to the seat frame and the vibrator is vibrated based on the input sound source signal such that the normal direction of an attachment surface of the seat frame to which the vibrator is attached corresponds to the vibration direction of the vibrator. As a result, sufficient vibration can be imparted to the seated occupant based on the sound source signal.

Further, since vibration is transmitted to a wide area of the seat cushion through the seat frame, even if the posture of the seated occupant shifts, sufficient vibration based on the sound source signal can be imparted to the seated occupant.

Further, since the vibrator is installed at the lower part of the seat frame on the rear face side such that it imparts vibration to the lower back of the seated person, compared to a case of imparting vibration to an area from above the waist to the area below the shoulder blades, discomfort and strangeness felt by the seated occupant can be reduced. Further, the vibrator can be installed so as not to affect the workability of the seat cushion.

In addition, a low pass filter is used to extract low frequency range components from the sound source signal, a specific signal corresponding to the bass drum is detected from the low frequency range components, and the vibrator on the rear face side is vibrated with low frequency components in accordance with the timing of detection of a specific signal. As a result, discomfort felt by the seated person can be reduced and, in addition, the seated occupant can enjoy music with a good sense of rhythm. Further, the seated occupant can feel the sound of the bass drum at their back.

In addition, a low-pass filter is used to extract low frequency range components from the sound source signal, and the vibrator on the seat surface side is vibrated with low frequency range components including the bass sound. In this way, by imparting different vibrations to the back and thighs of the seated person, music can be experienced without any discomfort. In addition, since the low frequency range can be felt by the entire lower body, there is no need to use a large low frequency range speaker (subwoofer), which contributes to an increase in the vehicle's luggage space and a reduction in vehicle weight.

In addition, in a case in which the vibration unit is attached to the seat cushion, depending on the weight of the seated occupant and the material and thickness of the cushion, the amount of compression of the cushion may increase, and there are cases in which the seated occupant may feel discomfort, as if their body is directly touching the vibration unit. In the embodiment of the technique of the present disclosure, since the vibrator is attached to the seat frame, compared to a case in which the vibrator is attached to the seat cushion, there is no sense of discomfort caused by the collapse of the seat cushion, and further, differences in the effective amount of vibration caused by differences in the weight of the seated occupant can also be absorbed.

Further, the vibrator on the seat surface side mainly reproduces low frequency range components of music (such as 150 Hz or less), which can give the seated occupant a sensation of having their entire lower body wrapped up, which can improve the seated occupant's sense of immersion in the music.

In addition, by allowing the seated occupant to experience the music sound source signals not only via their hearing but also via their sense of touch, a more immersive musical experience can be provided.

Furthermore, because the vibrator is attached so as to be in direct contact with the seat frame, the vibrations are not attenuated and can be transmitted over a wide range.

In addition, while, in the conventional art, the vibration of the vibration unit is damped by seat springs, and sufficient vibration cannot be obtained, in the embodiment of the technique disclosed herein, sufficient vibration based on a sound source signal can be imparted to a seated occupant.

Further, in the conventional art, in a case in which the vibration unit is attached to the seat cushion or is attached to the seat spring, the cushion or spring absorbs the vibration and the effect is not sufficient. In contrast, in the embodiment of the technique of the present disclosure, sufficient vibration can be imparted to the seated occupant based on the sound source signal.

Furthermore, in a case in which vibration is imparted to the human body, if the vibration is continuously imparted to the same part of the body, the vibration becomes hard to sense. In addition, since the vibration is localized, the effect is further reduced if the seated occupant's body moves away from the position at which the vibration unit is attached. In the embodiment of the technique of the present disclosure, since vibration is transmitted to a wide area of the seat cushion via the seat frame, even if the posture of the seated occupant shifts, sufficient vibration based on the sound source signal can be imparted to the seated occupant.

According to the technique of the present disclosure, the vibrator has a vibration face attached to the seat frame. The control unit causes the vibrator to vibrate based on the input sound source signal. The vibration of the vibrator is transmitted to the seat occupant via the seat frame and the seat cushion.

In this way, the vibration face of the vibrator is attached to the seat frame, and the vibrator is vibrated based on the input sound source signal, as a result of which sufficient vibration can be imparted to the seated occupant based on the sound source signal.

The control unit according to the technique of the present disclosure can use a low pass filter to extract low frequency range components from the sound source signal, and vibrate the vibrator with the low frequency range components.

The control unit according to the technique of the present disclosure can detect a specific signal from the sound source signal, and vibrate the vibrator in accordance with the detection timing of the specific signal.

The vibrator according to the technique of the present disclosure can include a rear face-side vibrator attached to the seat frame on the rear face side, and a seat surface-side vibrator attached to the seat frame on the seat surface side.

The control unit according to the technique of the present disclosure can use a low pass filter to extract low frequency range components from the sound source signal, and vibrate the seat surface-side vibrator with the low frequency range components, and can detect a specific signal from the sound source signal, and vibrate the rear face-side vibrator in accordance with the detection timing of the specific signal.

The control unit according to the technique of the present disclosure can use the low pass filter to extract low frequency range components from the sound source signal, and vibrate the seat surface-side vibrator with the low frequency range components, and can detect a specific signal from the low frequency range components, and vibrate the rear face-side vibrator with the low frequency range components in accordance with the detection timing of the specific signal.

The control unit according to the technique of the present disclosure can detect a signal having a component in a specific frequency range equal to or greater than a threshold value as the specific signal from the low frequency range components, and vibrate the rear vibrator with the low frequency range components for a predetermined period including the timing of the detection of the specific signal.

The vibrator according to the technique disclosed above may be configured as an actuator. Further, the vibrator may be configured as a voice coil actuator, a solenoid, or a linear actuator.

The technique of the present disclosure is not limited to the above-described embodiments, and various modifications and applications are possible within a range that does not depart from the gist of the technique of the present disclosure.

For example, while, in the above-described embodiment, an example of a case in which a voice coil actuator is used as the vibrator is explained, there is no limitation to this, and actuators other than voice coil actuators may also be used. For example, solenoids and linear actuators are included.

Further, while an example has been explained of a case in which the vibrator on the rear face side is vibrated in response to a specific signal corresponding to the bass drum, there is no limitation to this. The vibrator on the rear face side may be vibrated in response to a specific signal corresponding to a sound other than the bass drum, or the vibration may be effected by low frequency range components extracted from the sound source signal using a low pass filter.

Further, while an example has been explained in which the seat surface-side vibrator is vibrated by low frequency range components extracted from the sound source signal using a low pass filter, there is no limitation to this. The vibrator on the seat surface side may be vibrated in response to a specific signal corresponding to the bass drum.

Further, while an example has been explained in which the input sound source signal is a sound source signal for playing music, there is no limitation to this. For example, the input sound source signal may be a movie sound source signal or an engine noise sound source signal.

With the recent promotion of electrification of automobiles, there has been a notable trend toward replacing internal combustion engines with electric motors. Owing to their configuration, internal combustion engines generate vibration, whereas electric motors do not. In electric vehicles, the vibrator is vibrated in response to a sound source signal of engine noise as feedback for driving operations such as accelerator operation, which helps the driver to assess a situation. Further, the driver may be allowed to arbitrarily turn on and off the function of vibration in response to the sound source signal of the engine noise. Alternatively, driving pleasure can be improved by varying the vibration strength depending on the driving mode. For example, vibration could conceivably be increased in sports mode. In addition, by making it possible to turn on and off the vibration function in response to the engine noise sound source signal for each seat, vibration that is unnecessary for passengers can be eliminated.

Further, while an example has been explained of a case in which a specific signal is detected from low frequency range components extracted from a sound source signal using a low pass filter, there is no limitation to this. A specific signal may be detected from the sound source signal without passing the signal through a low pass filter.

Further, the left and right vibrators on the seat surface side and the left and right vibrators on the rear face side may be vibrated in accordance with left and right channels of the sound source. As a result of this, panning and the like can be reproduced.

Further, the technique of the present disclosure may be applied to vibration of objects other than vehicle seats.

Further, sensors for measuring load may be attached to plural positions on the seat surface, and the vibration strength of the vibrator may be changed in accordance with the load of the occupant. For example, since vibration is felt differently by passengers depending on their body types and sitting positions, the vibration strength may be configured to be changed. Specifically, since heavier people tend to feel vibrations more easily, based on the load measured by the sensor, the heavier the passenger is, the smaller the vibration strength is made, and the lighter the body weight, the greater the vibration strength is made. Further, since the deeper one sits, the more likely one is to feel the vibration, based on the distribution of load measured by the sensor, the deeper the passenger sits, the smaller the vibration strength is made, and the shallower the seating, the greater the vibration strength is made. More specifically, since, in a case in which one is heavy and sits deeply, one is most likely to feel vibrations, the vibration strength is set to the lowest, and since, in a case in which one is of lighter weight and sits shallowly, one is least likely to feel the vibration, the vibration strength is increased to the maximum.

The following supplementary notes are further disclosed regarding the foregoing embodiment.

[Supplementary Note 1]

A vibration device that vibrates a vehicle seat, the vibration device including:

a vibrator that has a vibration face that is attached to a seat frame forming a framework of the vehicle seat, the vibrator imparting vibration to the seat frame; and a control unit that causes the vibrator to vibrate based on an input sound source signal.

[Supplementary Note 2]

The vibration device of supplementary note 1, in which the control unit extracts a low frequency range component from the sound source signal using a low pass filter, and causes the vibrator to vibrate with the low frequency range component.

[Supplementary Note 3]

The vibration device of supplementary note 1 or 2, in which the control unit detects a specific signal from the sound source signal, and causes the vibrator to vibrate in accordance with a detection timing of the specific signal.

[Supplementary Note 4]

The vibration device of any one of supplementary notes 1 to 3, in which the vibrator includes a rear face-side vibrator attached to a rear face-side seat frame, and a seat surface-side vibrator attached to a seat surface-side seat frame.

[Supplementary Note 5]

The vibration device of supplementary note 4, in which the control unit:

extracts a low frequency range component from the sound source signal using a low pass filter, and causes the seat surface-side vibrator to vibrate with the low frequency range component, and detects a specific signal from the sound source signal, and causes the rear face-side vibrator to vibrate in accordance with a detection timing of the specific signal.

[Supplementary Note 6]

The vibration device of supplementary note 5, in which the control unit:

extracts the low frequency range component from the sound source signal using the low pass filter, and causes the seat surface-side vibrator to vibrate with the low frequency range component, and detects the specific signal from the low frequency range component, and causes the rear face-side vibrator to vibrate with the low frequency range component in accordance with the detection timing of the specific signal.

[Supplementary Note 7]

The vibration device of supplementary note 6, in which the control unit detects, as the specific signal from the low frequency range component, a signal in which a component in a specific frequency range is equal to or higher than a threshold value, and causes the rear face-side vibrator to vibrate with the low frequency range component for a predetermined period including the detection timing of the specific signal.

[Supplementary Note 8]

The vibration device of any one of supplementary notes 1 to 7, in which the vibrator is an actuator.

The disclosure of Japanese Application No. 2022-025685 is incorporated herein by reference in its entirety.

All publications, patent applications and technical standards mentioned herein are incorporated herein by reference to the same extent as if each individual publication, patent application and technical standard were specifically and individually indicated to be incorporated by reference.

The invention claimed is:

1. A vibration device that vibrates a vehicle seat, the vibration device comprising:

a vibrator that has a vibration face that is attached to a seat frame forming a framework of the vehicle seat, the vibrator imparting vibration to the seat frame; and a control unit that causes the vibrator to vibrate based on an input sound source signal, wherein the vibrator comprises a rear face-side vibrator attached to a rear face-side seat frame, and a seat surface-side vibrator attached to a seat surface-side seat frame, and wherein the control unit:

extracts a low frequency range component from the sound source signal, and causes the seat surface-side vibrator to vibrate with the low frequency range component, and detects, from the low frequency range component, peaks having a signal level that is equal to or higher than a threshold value, and causes the rear face-side vibrator to vibrate with the low frequency range component for a predetermined period of time including a detection timing of the peaks.

2. The vibration device of claim 1, wherein the rear face-side vibrator is attached at a position at which the rear face-side vibrator imparts vibration to a lower back of a seated person.

3. The vibration device of claim 1, wherein:

the seat surface-side vibrator includes left and right vibrators;

the rear face-side vibrator includes left and right vibrators, and the control unit causes the left and right vibrators of the seat surface-side vibrator and the left and right vibrators of the rear face-side vibrator to vibrate in accordance with left and right channels of the sound source signal.

4. The vibration device of claim 1, wherein:

the low frequency range component is 150 Hz or less, and the control unit detects the peaks after increasing the signal level of a 50 to 80 Hz component with respect to an output signal of the low frequency range component.

5. The vibration device of claim 1, wherein the vibrator comprises an actuator, and a vibration direction of the actuator corresponds to a normal direction of the vibration face.

6. A vibration device that vibrates a vehicle seat, the vibration device comprising:

a vibrator that has a vibration face that is attached to a seat frame forming a framework of the vehicle seat, the vibrator imparting vibration to the seat frame; and a control unit that causes the vibrator to vibrate based on an input sound source signal, wherein the vibrator comprises a rear face-side vibrator attached to a rear face-side seat frame, and a seat surface-side vibrator attached to a seat surface-side seat frame, and wherein the control unit:

extracts a low frequency range component from the sound source signal, and causes the rear face-side vibrator to vibrate with the low frequency range component, and detects, from the low frequency range component, peaks having a signal level that is equal to or higher than a threshold value, and causes the seat surface-side vibrator to vibrate with the low frequency range component for a predetermined period of time including a detection timing of the peaks.

7. The vibration device of claim 6, wherein the rear face-side vibrator is attached at a position at which the rear face-side vibrator imparts vibration to a lower back of a seated person.

8. The vibration device of claim 6, wherein:

the seat surface-side vibrator includes left and right vibrators;

the rear face-side vibrator includes left and right vibrators, and the control unit causes the left and right vibrators of the seat surface-side vibrator and the left and right vibrators of the rear face-side vibrator to vibrate in accordance with left and right channels of the sound source signal.

9. The vibration device of claim 6, wherein:

the low frequency range component is 150 Hz or less, and the control unit detects the peaks after increasing the signal level of a 50 to 80 Hz component with respect to an output signal of the low frequency range component.

10. The vibration device of claim 6, wherein the vibrator comprises an actuator, and a vibration direction of the actuator corresponds to a normal direction of the vibration face.

\* \* \* \* \*